United States Patent [19]

Langston et al.

[11] 4,400,400

[45] Aug. 23, 1983

[54] ACID SOLUBLE BLUE COLORANT FOR FOOD PRODUCTS

[75] Inventors: Metty S. K. Langston, Ossining, N.Y.; Il-Young Maing, Burke, Va.

[73] Assignee: General Foods Corporation, White Plains, N.Y.

[21] Appl. No.: 362,202

[22] Filed: Mar. 26, 1982

[51] Int. Cl.³ .................... A23L 1/272; A23L 1/275; A23L 2/38
[52] U.S. Cl. ........................................ 426/51; 426/52; 426/63; 426/250; 426/540; 426/590; 8/401; 8/438; 260/112 R
[58] Field of Search .................. 426/540, 250, 52, 51, 426/63, 590; 8/401, 438; 260/112 R

[56] References Cited

U.S. PATENT DOCUMENTS 4,027,042  5/1977  von Elbe .............................. 426/52
4,250,197  2/1981  Koch ................................... 426/540
4,320,050  3/1982  Rebeller ............................. 426/540

*Primary Examiner*—Jeanette M. Hunter
*Attorney, Agent, or Firm*—Joseph T. Harcarik; Thomas R. Savoie; Daniel J. Donovan

[57] ABSTRACT

Spirulina blue, which is not soluble at low pH, is subjected to enzymatic hydrolysis in an aqueous alkaline medium. The pH of the aqueous system is lowered and the liquid phase is dried to produce a blue dye in dry form which is soluble at low pH. The blue dye is useful as a blue colorant in food products, particularly food products, such as beverages, in which acid solubility is desired.

7 Claims, No Drawings

ACID SOLUBLE BLUE COLORANT FOR FOOD PRODUCTS

BACKGROUND OF THE INVENTION

This invention relates to a natural, acid soluble blue pigment suitable as a food colorant. More particularly, the invention relates to an acid soluble spirulina blue pigment in dry form and to methods of making same. The pigment is particularly useful in food products in which an acid-soluble blue colorant is desired.

Blue pigments for food products are, of course, known. However, there are few natural blue pigments which are acid soluble, have appropriate hue and, are approved for use in foods and new pigments suitable for use in food products are desirable.

It is an object of the invention to provide an acid soluble spirulina blue pigment. It is a further object to provide an effective method for the preparation of the pigment, and it is a further object to provide such pigments in a form suitable for use in food products such as beverages and dry beverage mixes.

BRIEF SUMMARY OF THE INVENTION

The foregoing and other objects are achieved in accordance with the invention by providing a process for making an acid soluble spirulina blue pigment in dry form which comprises enzymatically hydrolyzing spirulina blue in an aqueous medium at an alkaline pH in the presence of a proteolytic enzyme, acidifying the aqueous hydrolysis medium, and drying the liquid phase of the acidified aqueous hydrolysis medium to provide an acid soluble spirulina blue pigment in dry form. The pigment can be readily provided in bland form by treatment with suitable adsorbents such as charcoal. The pigment is used as a blue colorant in food products and is particularly useful in food products, such as beverages, where acid-solubility is desired.

DETAILED DESCRIPTION

Spirulina blue is a readily available pigment obtained from blue-green algae. It is not soluble at low pH (e.g. pH 4.0) and has a disagreeable algae-like taste.

In accordance with the present invention, spirulina blue is subjected to treatment with one or more proteolytic enzymes at an alkaline pH. This hydrolysis reaction is preferably carried out at a mildly alkaline pH with an alkaline microbial protease (i.e. a microbial protease having an optimum pH within the alkaline range). Typically, this reaction should be at a pH within the range of from about 7.5 to 10.0, preferably about 7.8 to 8.5.

Preferred among the alkaline microbial proteases are the alkaline bacterial proteases, especially those from genus Bacillus, and most preferred are those from *B. Subtilis*. Suitable microbial alkaline protease is available commercially as Bioprase, Alcalase, Maxatase, etc. or it can be prepared using standard, sanitary and acceptable procedures as described in *Enzymes in Food Processing*, Reed et al., p. 209 (1966). Other suitable proteolytic enzymes include Nagase, trypsin, chymotrypsin, and the like.

The amount of enzyme used will generally be about 0.5 to 50 Anson units per 100 grams of spirulina blue. A preferred procedure is to use about 1 to 20 Anson units per 100 grams, and a typical example is 6 Anson units per 100 grams of the spirulina blue. An Anson unit is defined as that amount of enzyme which under standard conditions will digest hemoglobin at an initial rate such that there is liberated per minute an amount of split products not precipitated by trichloroacetic acid which gives the same color with phenol reagent as 1 microequivalent of tyrosine.

It is preferred to condition the protein of the spirulina blue before treating with the enzyme, to enhance efficiency of the hydrolysis. Preferably, this is accomplished by establishing the pH of the suspension at a weakly alkaline value and heating. Typically, the pH is adjusted by the addition of a suitable base such as sodium hydroxide to within the range of from about 7.5 to 10, preferably 8 to 9, and the temperature is raised to boiling or close to boiling, typically, 80° to 100° C.

The enzymatic hydrolysis reaction is typically conducted at temperatures lower than those employed during the initial heating. Accordingly, it is usually necessary to cool the suspension to the desired hydrolysis temperature, typically, to from about 25° to 65° C. Preferably, the temperature is reduced to and maintained at about 50° C. for the hydrolysis reaction.

According to the preferred mode of the invention, the reaction is continued for about 50 to 120 minutes, at 50° C. Those skilled in the art will be aware of the relationship between time and temperature outside the preferred ranges. Upon completion of the reaction, the enzymes are inactivated. Preferably, this is accomplished by acidification or by raising the temperature to a level and for a time effective to cause inactivation. Temperatures of from about 85° C. to 90° C. and times of from about 2 to 5 minutes are generally effective, with the lower temperatures requiring the longer times. If heat is used to terminate hydrolysis, the aqueous medium is thereafter acidified to dissolve the acid soluble constituents.

At this point, the soluble hydrolysate is separated from the insoluble material remaining in the acidified suspension. This can be accomplished by any suitable technique such as filtration or centrifugation, with centrifugation being preferred. Preferably, the insoluble portion is washed at low pH to separate therefrom any further acid-soluble hydrolysate, and the wash water is added to the solution of soluble hydrolysate.

Depending on its use, the aqueous phase can be dried to provide the blue pigment in a dry form soluble in aqueous acidic solution. Drying can be effected in any convenient manner and spray drying, which provides the pigment in dry powder form, is preferred. The dried product, however, has residual algae-like taste. Where such taste is undesirable, as in food products, it is preferred to treat the acidified aqueous phase prior to drying to remove the algae-like taste. This is readily accomplished by treating the aqueous phase with a conventional adsorbent, such as charcoal, prior to drying. The dried product thus produced is bland and useful as a blue pigment in food products.

EXAMPLE 1

20 g of spirulina blue pigment was dissolved in 100 ml water. The pigment solution was adjusted to a pH of 8.0 with 1 N NaOH. The pigment solution was heated in 80° C. water bath for 5 min. The material was then cooled to 50° C. in running tap water. The pH of the pigment solution was re-adjusted to 8.0 with 1 N NaOH. 2 g of liquid Alcalase 0.6 L (Novo Lab Inc., 0.6 Anson units/g) was added. The pH of the pigment solution was maintained at pH=8.0 by adding NaOH during the period of hydrolysis. The temperature of the pigment solution was also maintained at 50° C. during the hydrolysis. The hydrolyis was terminated at 120 min. after the addition of enzyme by quickly dropping the pH of the pigment solution to 3.0 with concentrated hydrochloric acid. The material was centrifuged at 15,000 rpm for 10 min. The supernatent was passed through as activated carbon bed (Westvaco Co. Nuchar WVW) before it was spray dried (inlet temp.=130° C.).

Results of the Treated Concentrate

| Sample | Clarity in pH-3.0 medium | Flavor | Over-all |
|---|---|---|---|
| Treated Spirulina | clear | bland | excellent |
| Control (un-treated) | cloudy | algae-liked | unacceptable |

EXAMPLE 2

Concentrated phosphoric acid was added to an alkaline solution containing 20% by weight spirulina blue to lower the pH to 4.0. The slurry was centrifuged and the supernatant discarded. The precipitate is re-dissolved in water by adjusting pH to 8 with NaOH. The alkaline solution was hydrolyzed with Alcalasa enzyme (20% w/v) for 70 minutes at 50° C. Hydrolysis was terminated by adjustment of pH to 3.0 by the addition of concentrated phosphoric acid. The reaction mixture was centrifuged and after separation of the solids, the supernatant was passed through a charcoal bed and spray dried as in Example 1. Results were as reported in Example 1.

EXAMPLE 3

The acid soluble spirulina blue pigment produced in accordance with the present invention can be used to replace conventional blue colorant such as FD&C blue #1 in low pH (pH 4.5) beverage, e.g. lemon-lime dry beverage mix.

The powder form of this acid soluble spirulina blue pigment can be added directly to the dry beverage mix. When the beverage is reconstituted, a clear solution can be achieved.

| | grams |
|---|---|
| Citric acid | 3.85 |
| Vitamin C | 0.08 |
| Lemon Lime Flavor | 0.11 |
| Lemon Juice Dried with corn syrup solid | 0.05 |
| FD&C yellow 5 | 0.006 |
| Enzyme treated spirulina blue of Example 1 | 6.94 |
| Sugar | 189.0 |

The foregoing dry mix is dissolved in two quarts of water. The beverage is comparable in color and flavor to a beverage made from the same mix in which FD&C Blue #1 was employed rather than the enzyme treated spirulina blue.

What is claimed is:

1. A method for making an acid soluble spirulina blue pigment which comprises:

enzymatically hydrolyzing spirulina blue at a temperature of from 25° to 65° C. in an aqueous medium at a pH ranging from 7.5 to 10.0 in the presence of a proteolytic enzyme;

acidifying the aqueous alkaline hydrolyzed spirulina blue pigment to effect percipitation of acid-insoluble spirulina blue, and dissolving the separated acid-soluble spirulina blue in an aqueous alkaline solution;

and drying the liquid phase of the acidified aqueous hydrolysis medium to provide an acid soluble spirulina blue pigment in dry form.

2. A method according to claim 1 further comprising the step of contacting the liquid phase of the acidified aqueous hydrolysis medium with an adsorbent prior to drying said liquid phase to provide an acid soluble spirulina blue pigment in dry form which is bland and free of algae-like taste.

3. A method according to claim 1 wherein said proteolytic enzyme is selected from the group consisting of trypsin, chymotrypsin, nagase and alkaline bacterial protease.

4. Acid soluble spirulina blue pigment in dry form.

5. Bland acid soluble spirulina blue pigment in dry form.

6. In a dry beverage mix containing a blue colorant, the improvement wherein said blue colorant comprises a bland acid soluble spirulina blue pigment in dry form.

7. In a beverage containing a blue colorant, the improvement wherein said blue colorant comprises a bland acid soluble spirulina blue pigment.

* * * * *